(12) United States Patent
Fujii et al.

(10) Patent No.: US 11,732,648 B2
(45) Date of Patent: Aug. 22, 2023

(54) GAS TURBINE ENGINE

(71) Applicant: KAWASAKI JUKOGYO KABUSHIKI KAISHA, Kobe (JP)

(72) Inventors: Takafumi Fujii, Kobe (JP); Hikaru Maesato, Kobe (JP); Tatsuya Okuwa, Kobe (JP); Shutaro Ichimura, Kobe (JP); Hiromasa Ikai, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 17/638,719

(22) PCT Filed: Aug. 27, 2020

(86) PCT No.: PCT/JP2020/032458
§ 371 (c)(1),
(2) Date: Feb. 25, 2022

(87) PCT Pub. No.: WO2021/039928
PCT Pub. Date: Mar. 4, 2021

(65) Prior Publication Data
US 2022/0290607 A1    Sep. 15, 2022

(30) Foreign Application Priority Data

Aug. 30, 2019 (JP) ................................ 2019-157865

(51) Int. Cl.
*F02C 7/06* (2006.01)
*F01D 25/18* (2006.01)

(52) U.S. Cl.
CPC ............... *F02C 7/06* (2013.01); *F01D 25/18* (2013.01); *F05D 2260/98* (2013.01)

(58) Field of Classification Search
CPC ......... F02C 7/06; F05D 2260/98; F01D 25/18
See application file for complete search history.

(56) References Cited

U.S. PATENT DOCUMENTS 4,284,174 A * 8/1981 Salvana .................. F16C 19/52
                                                60/39.08
7,836,675 B2 * 11/2010 Corattiyil .................. F02C 7/06
                                                60/39.08

(Continued)

FOREIGN PATENT DOCUMENTS

JP        4-124399 U      11/1992
JP        10-89087 A       4/1998

(Continued)

OTHER PUBLICATIONS

International Search Report for PCT/JP2020/032458 dated Nov. 2, 2020 [PCT/ISA/210].

*Primary Examiner* — Steven M Sutherland
(74) *Attorney, Agent, or Firm* — Sughrue Mion, PLLC

(57) ABSTRACT

A gas turbine engine includes: a casing that accommodates a compressor and the like; bearings; a main lubricator including an oil mist generator that generates oil mist by mixing oil with compressed air extracted from the compressor and a first supply passage through which the oil mist is guided to the bearings; and a starting lubricator including a second supply passage through which a gas flowing out from a gas source is guided to a connection portion of the first supply passage, the connection portion being connected to the second supply passage, and an opener that starts supply of the gas from the gas source. The main lubricator supplies the oil mist to the bearings through the first supply passage by the pressure of the compressed air extracted from the compressor. When the opener starts the supply of the gas, the starting lubricator supplies the oil mist to the bearings by the pressure of the gas flowing out from the gas source.

7 Claims, 5 Drawing Sheets

(56) References Cited

U.S. PATENT DOCUMENTS

| | | | |
|---|---|---|---|
| 8,651,240 B1 * | 2/2014 | Motto | F16B 13/0816 |
| | | | 184/7.4 |
| 2005/0034924 A1 | 2/2005 | James et al. | |
| 2013/0174574 A1 | 7/2013 | Heaton et al. | |

FOREIGN PATENT DOCUMENTS

| | | |
|---|---|---|
| JP | 2001-165390 A | 6/2001 |
| JP | 2005-061399 A | 3/2005 |

* cited by examiner

GAS TURBINE ENGINE

CROSS REFERENCE TO RELATED APPLICATIONS

This application is a National Stage of International Application No. PCT/JP2020/032458 filed Aug. 27, 2020, claiming priority based on Japanese Patent Application No. 2019-157865 filed Aug. 30, 2019.

TECHNICAL FIELD

One aspect of the present disclosure relates to a gas turbine engine utilized in a flying object, an aircraft, or the like.

BACKGROUND ART

PTL 1 discloses a mechanism that supplies oil mist to a bearing in a gas turbine engine of a flying object. According to this oil mist supply mechanism, while the flying object is flying, compressed air is introduced from a compressor of the engine to an oil mist generating means. The oil mist generating means generates the oil mist from oil by the introduced compressed air. The generated oil mist is supplied to the bearing.

CITATION LIST

Patent Literature

PTL 1: Japanese Laid-Open Patent Application Publication No. 2001-165390

SUMMARY OF INVENTION

Technical Problem

According to the above-described oil mist supply mechanism, the compressed air from the compressor is necessary to supply the oil mist to the bearing. However, there is a possibility that since the pressure of the air of the compressor is low before the engine is started or immediately after the engine is started, the supply of the oil mist to the bearing becomes unstable. As a method of securing the lubricity of the bearing until the pressure of the air of the compressor becomes high to some extent, there may be a method of filling the bearing with grease before the engine is started, but such work extremely requires time and labor.

Solution to Problem

To solve the above problems, a gas turbine engine according to one aspect of the present disclosure is a gas turbine engine in which a compressor, a combustor, and a turbine are arranged so as to be lined up along a rotating shaft. The gas turbine engine includes: a casing accommodating the compressor, the combustor, and the turbine; bearings arranged in the casing; a main lubricator including an oil mist generator that generates oil mist by mixing oil with compressed air extracted from the compressor and a first supply passage through which the oil mist is guided to the bearings; and a starting lubricator including a second supply passage that is connected to a portion of the first supply passage and through which a gas flowing out from a gas source is guided to a connection portion of the first supply passage, the connection portion being the portion of the first supply passage, and an opener that starts supply of the gas from the gas source through the second supply passage to the connection portion. The main lubricator supplies the oil mist through the first supply passage to the bearings by pressure of the compressed air extracted from the compressor. When the opener starts the supply of the gas, the starting lubricator supplies the oil mist to the bearings through the second supply passage and a portion of the first supply passage which portion is located downstream of the connection portion, by the pressure of the gas supplied from the gas source.

There is a possibility that since the pressure of the air of the compressor is low, for example, before or immediately after the engine is started, the supply of the oil mist from the main lubricator to the bearings becomes unstable. Even in this case, according to the above configuration, when the opener starts the supply of the gas from the gas source, the oil mist can be supplied to the bearings by the pressure of the gas flowing out from the gas source. Therefore, the lubrication of the bearings when starting the engine can be easily performed.

Advantageous Effects of Invention

According to one aspect of the present disclosure, in a gas turbine engine including a lubricator that supplies oil mist to a bearing by air extracted from a compressor, lubrication of the bearing when starting the engine can be easily performed.

DESCRIPTION OF EMBODIMENTS

Hereinafter, embodiments will be described with reference to the drawings. In the following description, a "front side" denotes an upstream side in a direction in which air flows in an engine, and a "rear side" denotes a downstream side in the direction in which the air flows in the engine. A "radial direction" denotes a direction orthogonal to a rotation axis of a rotating shaft of the engine. A "circumferential direction" denotes a direction around the rotation axis of the rotating shaft of the engine.

Embodiment 1

Figure 1:
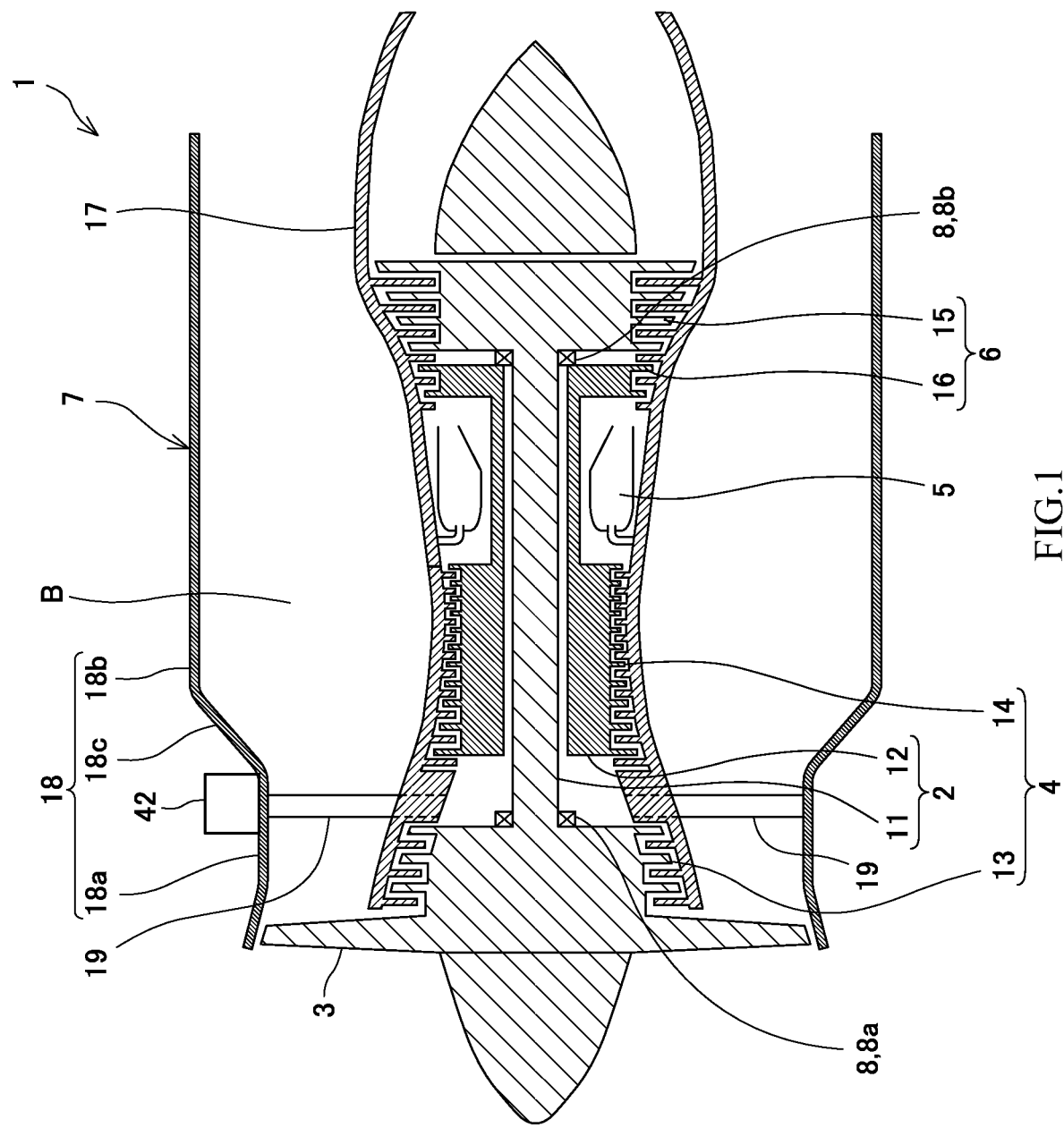
FIG. 1 is a schematic sectional view of a gas turbine engine according to Embodiment 1.

FIG. 1 is a sectional view of a gas turbine engine 1 according to Embodiment 1. The gas turbine engine 1 is an aircraft turbo fan engine and includes a rotating shaft 2, a fan 3, a compressor 4, a combustor 5, a turbine 6, and a casing 7. In the present embodiment and Embodiments 2 and 3 described below, an aircraft gas turbine engine is described as the gas turbine engine. However, the gas turbine engine is not especially limited to the aircraft gas turbine engine. The rotating shaft 2 extends in a front-rear direction of the gas turbine engine 1. The fan 3 is connected to a front portion of the rotating shaft 2 and rotates together with the rotating shaft 2. The compressor 4, the combustor 5, and the turbine 6 are lined up in this order from the front side toward the rear side along the rotating shaft 2. The casing 7 is a tubular object having an axis that coincides with a rotation axis of the rotating shaft 2. The casing 7 accommodates the rotating shaft 2, the fan 3, the compressor 4, the combustor 5, and the turbine 6.

Specifically, the gas turbine engine 1 is a two-shaft gas turbine engine. The compressor 4 includes a low-pressure compressor 13 and a high-pressure compressor 14 arranged behind the low-pressure compressor 13. For example, both the low-pressure compressor 13 and the high-pressure compressor 14 are axial flow compressors. However, the types of the low-pressure compressor 13 and the high-pressure compressor 14 are not limited to this. For example, the high-pressure compressor 14 may be a centrifugal compressor. The turbine 6 includes a low-pressure turbine 15 and a high-pressure turbine 16 arranged in front of the low-pressure turbine 15. The rotating shaft 2 includes a low-pressure shaft 11 and a high-pressure shaft 12. The low-pressure shaft 11 couples the low-pressure compressor 13 to the low-pressure turbine 15. The high-pressure shaft 12 couples the high-pressure compressor 14 to the high-pressure turbine 16. The high-pressure shaft 12 is a tubular shaft including a hollow space therein. The low-pressure shaft 11 is inserted into the hollow space of the high-pressure shaft 12. The low-pressure turbine 15 is coupled to the fan 3 through the low-pressure shaft 11.

The casing 7 includes an inner shell 17, an outer shell 18, and struts 19. The inner shell 17 has a substantially cylindrical shape and accommodates the compressor 4, the combustor 5, and the turbine 6. The outer shell 18 has a substantially cylindrical shape and is arranged concentrically with the inner shell 17 so as to be spaced apart from the inner shell 17 outward in the radial direction. The struts 19 are arranged at intervals in the circumferential direction. Each strut 19 couples the inner shell 17 to the outer shell 18. In the present embodiment, the strut 19 extends inward in the radial direction from the outer shell 18, penetrates the inner shell 17 in the radial direction, and extends to a passage of air compressed by the compressor 4. In the present embodiment, the struts 19 are arranged at positions between the low-pressure compressor 13 and the high-pressure compressor 14 in the axial direction of the rotating shaft 2. However, the positions of the struts 19 are not limited to this. The casing 7 may include a strut or struts other than the struts 19. For example, the casing 7 may include a strut or struts in front of the low-pressure compressor 13 in the axial direction of the rotating shaft 2 or behind the high-pressure compressor 14 in the axial direction of the rotating shaft 2. A cylindrical bypass passage B is formed between the inner shell 17 and the outer shell 18. Part of the air sucked by the fan 3 is supplied to the low-pressure compressor 13, and the rest of the air flows through the bypass passage B and is discharged to the rear side.

An outer peripheral surface of the outer shell 18 of the casing 7 includes a first region 18a, a second region 18b, and a third region 18c. The second region 18b is located behind the first region 18a, and the third region 18c connects the first region 18a and the second region 18b. The first region 18a is smaller in diameter than the second region 18b. The first region 18a is located at a position corresponding to at least the low-pressure compressor 13 in the front-rear direction (rotation axis direction). The second region 18b is located at a position corresponding to at least the combustor 5 in the front-rear direction (rotation axis direction). The third region 18c is an inclined region that gradually increases in diameter toward the rear side. A below-described cartridge 42 is arranged in the first region 18a.

The rotating shaft 2 is supported by bearings 8. The bearings 8 are arranged in an internal space of the casing 7 (more specifically, at a radially inner side of the inner shell 17) along the rotating shaft 2. In FIG. 1, among the bearings 8, only bearings 8a and 8b that support the low-pressure shaft 11 are shown, and bearings that support the high-pressure shaft 12 are not shown. The gas turbine engine 1 includes an oil mist supply system 20A that supplies oil mist to the bearings 8.

Figure 2:
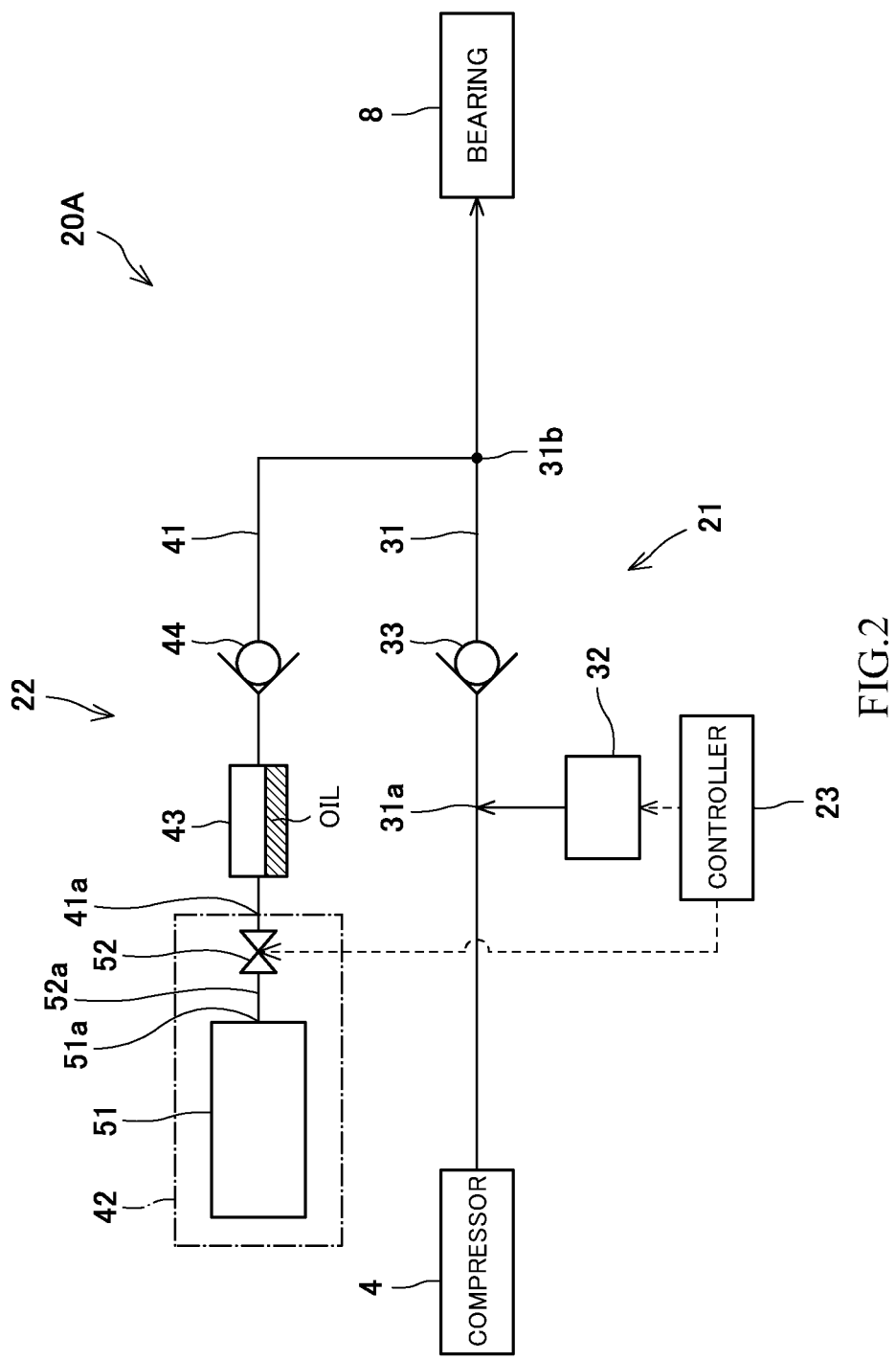
FIG. 2 is a schematic configuration diagram of an oil mist supply system of the gas turbine engine according to Embodiment 1.

FIG. 2 is a schematic configuration diagram of the oil mist supply system 20A. The oil mist supply system 20A includes a main lubricator 21, a starting lubricator 22, and a controller 23.

The main lubricator 21 is a lubricator that supplies the oil mist to the bearings 8 while the gas turbine engine 1 is operating. The main lubricator 21 supplies the oil mist to the bearings 8 by the pressure of the compressed air extracted from the compressor 4. The main lubricator 21 includes a first supply passage 31, an oil mist generator 32, and a first backflow preventer 33.

The first supply passage 31 guides the compressed air, extracted from the compressor 4, to the bearings 8. A side of the first supply passage 31 which side is close to the compressor 4 is referred to as an "upstream side," and a side of the first supply passage 31 which side is close to the bearings 8 is referred to as a "downstream side." The first supply passage 31 may be comprised of a pipe, a casing, a housing, or the like.

The oil mist generator 32 generates the oil mist by mixing oil with the compressed air extracted from the compressor 4. The oil mist generator 32 is located at a portion of the first supply passage 31 so as to be able to supply the generated oil mist to the portion of the first supply passage 31. For example, the oil mist generator 32 includes an electrically-operated lubricating oil pump that discharges a small amount of oil from a lubricating oil tank (not shown) to the portion (oil mixing portion 31a) of the first supply passage 31. The electrically-operated lubricating oil pump is disposed on, for example, an outer peripheral surface of the first region 18a. The oil mist generated at the oil mixing portion 31a is supplied through the first supply passage 31 to the bearings 8 by the pressure of the compressed air extracted from the compressor 4. The oil mist having cooled the bearings 8 is guided through a discharge passage (not shown) toward the bypass passage B (see FIG. 1) and is discharged to the bypass passage B. For example, the discharge passage may be disposed in the struts 19 and the strut(s) arranged at a different position(s).

The first backflow preventer 33 prevents a fluid from flowing through the first supply passage 31 from the downstream side to the upstream side. The first backflow preventer 33 is, for example, a check valve. The first backflow preventer 33 is disposed at a portion of the first supply passage 31 which portion is located upstream of a connection portion 31b of the first supply passage 31, the connection portion 31b being connected to a below-described second supply passage 41. In the present embodiment, the first backflow preventer 33 is disposed at a portion of the first supply passage 31 which portion is located downstream of the oil mist generator 32 (more specifically, the oil mixing portion 31a). The first backflow preventer 33 may be disposed at a portion of the first supply passage 31 which portion is located upstream of the oil mist generator 32 (more specifically, the oil mixing portion 31a).

The starting lubricator 22 is a lubricator that supplies the oil mist to the bearings 8 before or immediately after the gas turbine engine 1 is started. The starting lubricator 22 includes the second supply passage 41, the cartridge 42, an oil storing chamber 43, and a second backflow preventer 44.

An end portion of the second supply passage 41 is connected to a portion of the first supply passage 31. More specifically, the end portion of the second supply passage 41 is connected to a portion of the first supply passage 31 which portion is located downstream of the first backflow preventer 33. A portion where the first supply passage 31 and the second supply passage 41 are connected to each other is referred to as the "connection portion 31b." The cartridge 42 is connected to an end portion 41a of the second supply passage 41, the end portion 41a being opposite to the end portion connected to the connection portion 31b of the first supply passage 31. A side of the second supply passage 41 which side is close to the cartridge 42 is referred to as the "upstream side," and a side of the second supply passage 41 which side is close to the connection portion 31b is referred to as the "downstream side." The second supply passage 41 is comprised of a pipe, a casing, a housing, or the like.

The cartridge 42 is attachable to and detachable from the upstream end portion 41a of the second supply passage 41. The cartridge 42 includes a gas filled chamber 51 as a gas source, and an opener 52. The gas filled chamber 51 is filled with a high-pressure gas.

The opener 52 is a device that starts the supply of the gas from the gas filled chamber 51 as the gas source through the second supply passage 41 to the connection portion 31b. The opener 52 is disposed at a gas passage 52a located in the cartridge 42. The gas passage 52a connects a gas outlet 51a of the gas filled chamber 51 and the upstream end portion 41a of the second supply passage 41. In the present embodiment, the opener 52 is an electrically-driven on-off valve. The opener 52 changes a state between the gas filled chamber 51 and the first supply passage 31 from a blocked state to a communicating state or from the communicating state to the blocked state. Specifically, upon reception of a gas supply command from the controller 23, the opener 52 changes the state between the gas filled chamber 51 and the first supply passage 31 from the blocked state to the communicating state. With this, the gas is guided from the gas filled chamber 51 through the second supply passage 41 to the connection portion 31b.

The oil storing chamber 43 is disposed at the second supply passage 41. The oil storing chamber 43 stores a predetermined amount of oil. When the supply of the gas by the opener 52 starts, the high-pressure gas flows into the oil storing chamber 43 from the gas filled chamber 51. With this, in the oil storing chamber 43, the stored oil and the high-pressure gas are mixed with each other, and this generates the oil mist. By the pressure of the gas flowing out from the gas filled chamber 51, the generated oil mist is supplied to the bearings 8 through a portion of the second supply passage 41 which portion is located downstream of the oil storing chamber 43 and a portion of the first supply passage 31 which portion is located downstream of the connection portion 31b.

As above, when the opener 52 starts the supply of the gas, the starting lubricator 22 supplies the oil mist to the bearings 8 by the pressure of the gas flowing out from the gas filled chamber 51 as the gas source. The oil storing chamber 43 may be formed such that the stored oil and the gas flowing from the upstream side through the second supply passage 41 into the oil storing chamber 43 are mixed with each other. The oil storing chamber 43 may be, for example, a part of a pipe.

The second backflow preventer 44 prevents a fluid from flowing through the second supply passage 41 from the downstream side to the upstream side. The second backflow preventer 44 is, for example, a check valve. The second backflow preventer 44 is disposed at a portion of the second supply passage 41 which portion is located downstream of the oil storing chamber 43.

The controller 23 controls the supply of the oil mist to the bearings 8 from the main lubricator 21 and the starting lubricator 22. The controller 23 is a so-called computer and includes a calculation processing portion (such as a CPU) and a storage portion (such as a ROM and a RAM). The controller 23 is electrically connected to the oil mist generator 32 and the opener 52.

Before the gas turbine engine 1 is started, the controller 23 performs the supply of the oil mist by the starting lubricator 22. Specifically, the controller 23 transmits a gas supply command to the opener 52. With this, the on-off valve as the opener 52 opens, and the high-pressure gas flows into the oil storing chamber 43 from the gas filled chamber 51. Then, in the oil storing chamber 43, the oil mist is generated. By the pressure of the gas flowing out from the gas filled chamber 51, the generated oil mist is supplied to the bearings 8 through a portion of the second supply passage 41 which portion is located downstream of the oil storing chamber 43 and a portion of the first supply passage 31 which portion is located downstream of the connection portion 31b. The gas and the oil mist having flowed into the first supply passage 31 from the second supply passage 41 are prevented by the first backflow preventer 33 from flowing toward the compressor 4.

The starting lubricator 22 is only required to secure the lubricity of the bearings 8 in a short period of time until the supply of the oil mist by the main lubricator 21 can be stably executed. In other words, the amount of gas (i.e., the pressure of the gas) filled in the gas filled chamber 51 and the amount of oil stored in the oil storing chamber 43 are suitably adjusted such that the lubricity of the bearings 8 can be secured in the above-described period of time.

After the supply of the oil mist by the starting lubricator 22 is executed, the gas turbine engine 1 is started. However, the gas turbine engine 1 may be started before or simultaneously with the execution of the supply of the oil mist by the starting lubricator 22. For example, immediately after the gas turbine engine 1 is started, the supply of the oil mist by the starting lubricator 22 may be executed.

After the pressure of the compressor 4 is adequately increased by the start of the gas turbine engine 1, the controller 23 performs the supply of the oil mist by the main lubricator 21. Specifically, the controller 23 transmits an oil mist generating command to (the electrically-operated lubricating oil pump of) the oil mist generator 32. With this, the oil mist generator 32 generates the oil mist by mixing the oil with the compressed air extracted from the compressor 4. The generated oil mist is supplied to the bearings 8 through the first supply passage 31 by the pressure of the compressed air extracted from the compressor 4. The gas and the oil mist having flowed into the second supply passage 41 from the first supply passage 31 are prevented by the second backflow preventer 44 from flowing toward the cartridge 42.

According to the above-described configuration, even when the pressure of the air of the compressor 4 is low, such as before or immediately after the gas turbine engine 1 is started, the oil mist can be supplied to the bearings 8 by using the starting lubricator 22 by the pressure of the gas flowing out from the gas filled chamber 51. Therefore, the lubrication of the bearings 8 when starting the gas turbine engine 1 can be easily performed.

Moreover, in the present embodiment, the cartridge 42 includes the gas filled chamber 51 as the gas source. Therefore, the used cartridge 42 can be easily replaced with the new cartridge 42 that can be utilized as the gas source. On this account, the starting lubricator 22 can be easily set to a usable state.

Moreover, in the present embodiment, the backflow of the high-pressure fluid toward the oil mist generator 32 and the compressor 4 can be prevented by the first backflow preventer 33. Furthermore, the backflow of the high-pressure fluid toward the oil storing chamber 43 can be prevented by the second backflow preventer 44. Since the first backflow preventer 33 and the second backflow preventer 44 are the check valves, the backflow of the high-pressure fluid can be prevented by mechanical structure.

Moreover, in the present embodiment, since the opener 52 is the on-off valve, the state between the gas filled chamber 51 and the first supply passage 31 can be switched from the communicating state to the blocked state. Furthermore, the gas filled chamber 51 of the used cartridge 42 can be filled with the high-pressure gas again. Thus, the cartridge 42 can be repeatedly used.

For example, there is a possibility that if the starting lubricator 22 stores the oil and the high-pressure gas in the same space, only the high-pressure gas is guided to the bearings 8 by the start of the supply of the gas by the opener 52 with the oil staying in the space. However, in the present embodiment, the gas having flowed out from the gas filled chamber 51 as the gas source reaches the oil storing chamber 43 before reaching the bearings 8. Therefore, the gas having flowed out from the gas source and the oil can be surely mixed with each other, and the oil mist can be surely supplied to the bearings 8.

Embodiment 2

Next, the gas turbine engine 1 according to Embodiment 2 will be described with reference to FIG. 3. In the present embodiment and Embodiment 3 described below, the same reference signs are used for the same components as in Embodiment 1, and the repetition of the same explanation is avoided.

Figure 3:
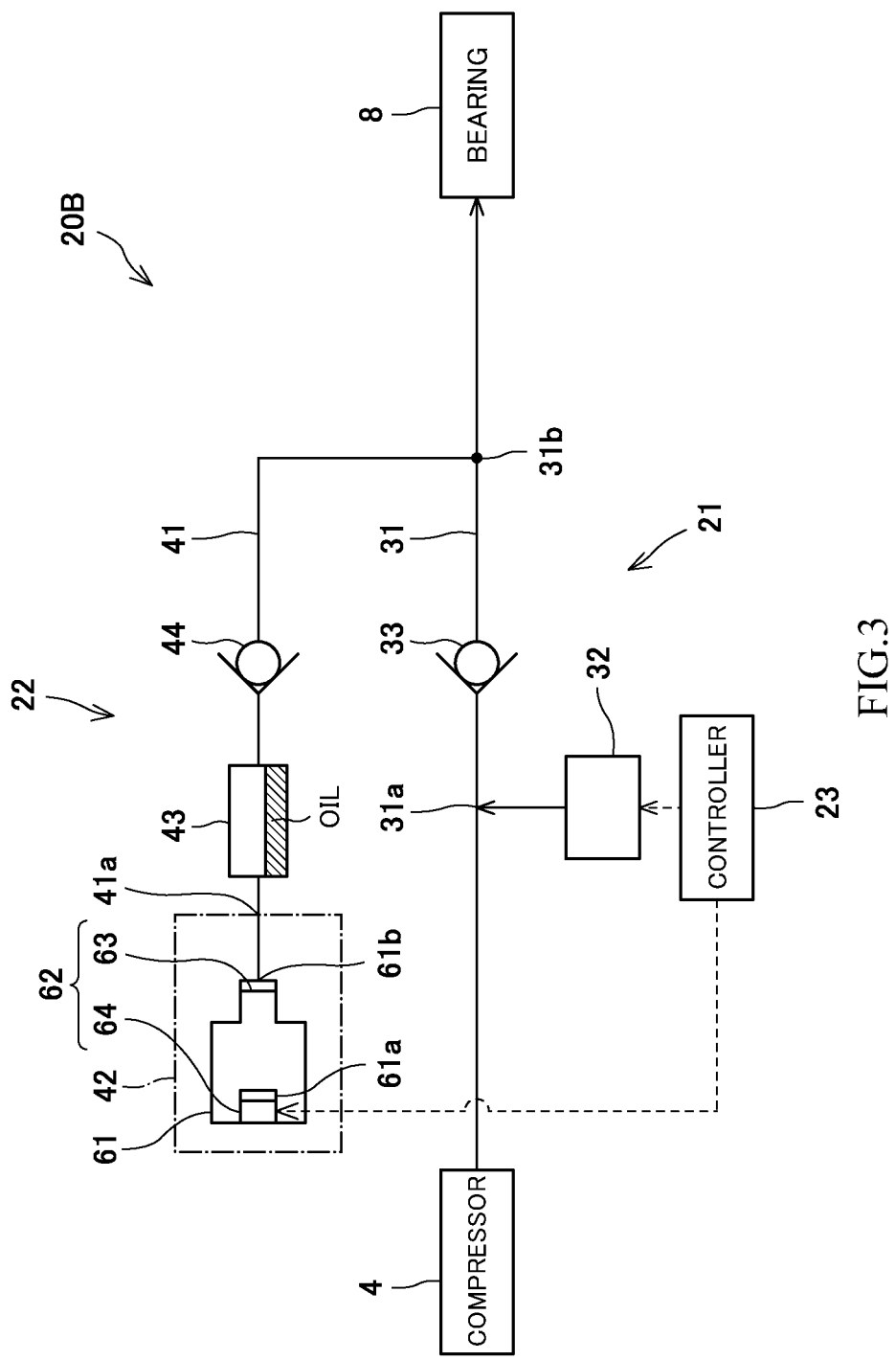
FIG. 3 is a schematic configuration diagram of the oil mist supply system of the gas turbine engine according to Embodiment 2.

FIG. 3 is a schematic configuration diagram of an oil mist supply system 20B of the gas turbine engine 1 according to Embodiment 2. In Embodiment 2, the gas source and the opener in the starting lubricator 22 are different in configuration.

Specifically, instead of the gas filled chamber 51 and the opener 52 in Embodiment 1, the cartridge 42 includes a gas generating chamber 61 and an opener 62. The gas generating chamber 61 stores a known gas generating agent 61a. The gas generating agent 61a is gunpowder that is ignited to generate a combustion gas.

The opener 62 starts the supply of the gas from the gas generating chamber 61 as the gas source through the second supply passage 41 to the connection portion 31b. In the present embodiment, the opener 62 includes a stopper 63 and a destroyer 64. The stopper 63 closes a gas outlet 61b of the gas generating chamber 61, and the destroyer 64 destroys the stopper 63.

The stopper 63 is a metal plate made of stainless steel, for example. The destroyer 64 is, for example, an igniter that ignites the gas generating agent 61a. To be specific, the igniter as the destroyer 64 ignites the gas generating agent 61a by an ignition command from the controller 23, and with this, the combustion gas is generated. The stopper 63 is destroyed by a shock wave generated by the generation of the combustion gas or by the pressure of the gas in the gas generating chamber 61 increased by the generation of the combustion gas. Thus, the opener 62 changes the state between the gas generating chamber 61 and the first supply passage 31 from the blocked state to the communicating state. The destroyer 64 may mechanically destroy the stopper 63 by using, for example, a pin without using a chemical reaction.

When the supply of the gas is started by the opener 62 as above, the high-pressure gas flows into the oil storing chamber 43 from the gas generating chamber 61. With this, in the oil storing chamber 43, the stored oil and the high-pressure gas are mixed with each other, and this generates the oil mist. By the pressure of the gas flowing out from the gas generating chamber 61, the generated oil mist is supplied to the bearings 8 through a portion of the second supply passage 41 which portion is located downstream of the oil storing chamber 43 and a portion of the first supply passage 31 which portion is located downstream of the connection portion 31b.

In the present embodiment, the same effects as in Embodiment 1 are obtained. Moreover, in the present embodiment, since the opener 62 includes the stopper 63 that closes the gas outlet 61b of the gas generating chamber 61 and the destroyer 64 that destroys the stopper 63, the opener 62 can be made smaller than the opener 62 that is an electrically driven valve. As a result, the cartridge 42 can be downsized.

Embodiment 3

Figure 4:
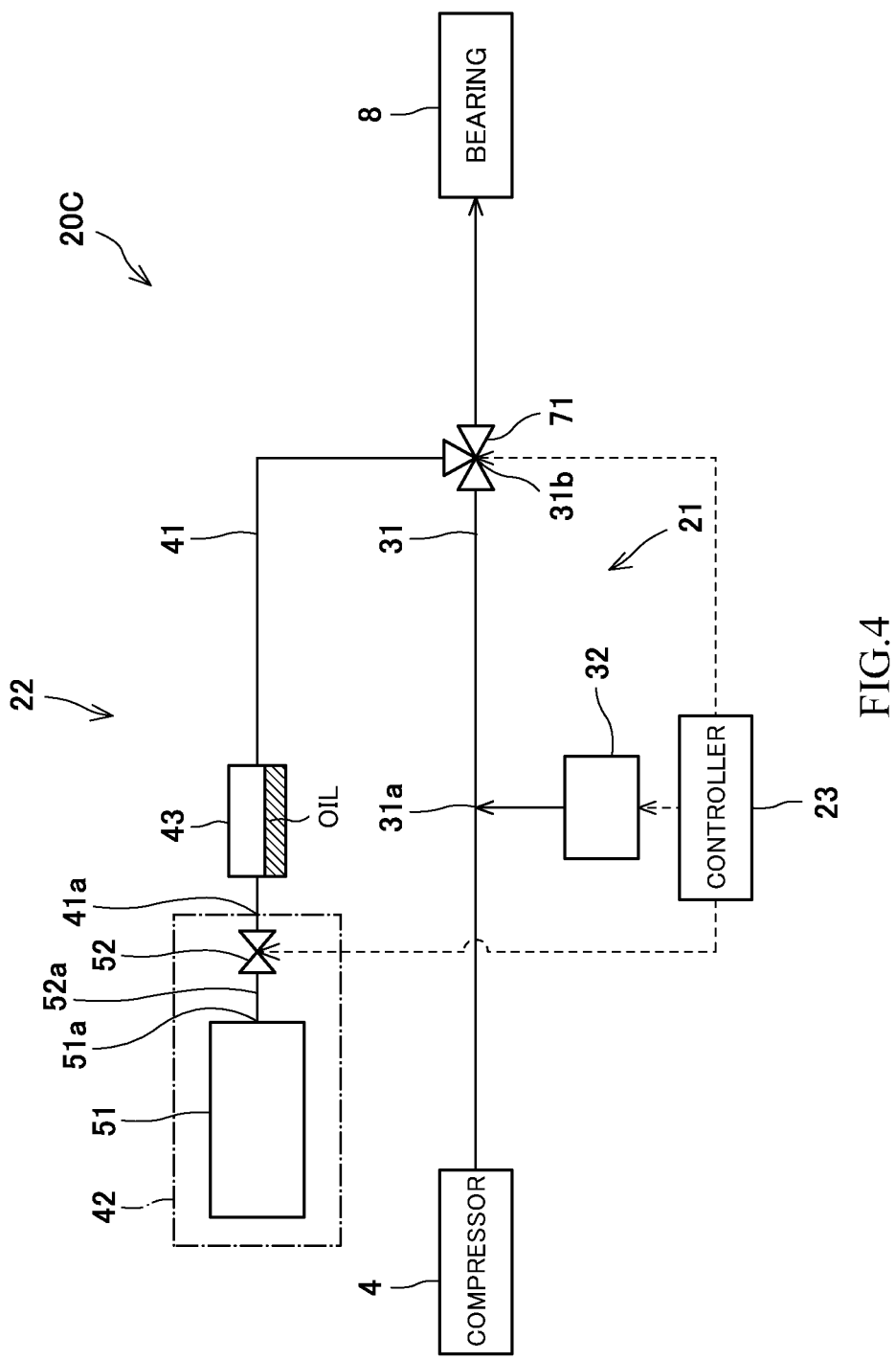
FIG. 4 is a schematic configuration diagram of the oil mist supply system of the gas turbine engine according to Embodiment 3.

Next, the gas turbine engine 1 according to Embodiment 3 will be described with reference to FIG. 4. FIG. 4 is a schematic configuration diagram of an oil mist supply system 20C of the gas turbine engine 1 according to Embodiment 3.

In the present embodiment, instead of respectively disposing the first backflow preventer 33 and the second backflow preventer 44 at the first supply passage 31 and the second supply passage 41, a three-way valve 71 is disposed at the connection portion 31b of the first supply passage 31, the connection portion 31b being connected to the second supply passage 41. To be specific, the three-way valve 71 serves as the "first backflow preventer" and the "second backflow preventer."

The three-way valve 71 switches between a first position and a second position. When the three-way valve 71 is set to the first position, a portion of the first supply passage 31 which portion is located upstream of the connection portion 31b and a portion of the first supply passage 31 which portion is located downstream of the connection portion 31b communicate with each other, and communication between the second supply passage 41 and the portion of the first supply passage 31 which portion is located downstream of the connection portion 31b is blocked. When the three-way valve 71 is set to the second position, communication between the portion of the first supply passage 31 which portion is located upstream of the connection portion 31b and the portion of the first supply passage 31 which portion is located downstream of the connection portion 31b is blocked, and the second supply passage 41 and the portion of the first supply passage 31 which portion is located downstream of the connection portion 31b communicate with each other.

The three-way valve 71 is an electrically driven valve and is electrically connected to the controller 23. When the three-way valve 71 is switched from the first position to the second position by a control signal transmitted from the controller 23 to the three-way valve 71, the supply of the oil mist by the starting lubricator 22 is started. When the engine 1 is driving, and the three-way valve 71 is switched from the second position to the first position by another control signal transmitted from the controller 23 to the three-way valve 71, the supply of the oil mist by the main lubricator 21 is started.

In the present embodiment, the same effects as in Embodiment 1 are obtained. Moreover, in the present embodiment, the backflow of the high-pressure fluid toward the oil mist generator 32 and the compressor 4 and the backflow of the high-pressure fluid toward the oil storing chamber 43 are prevented by a single device.

Modified Example

Figure 5:
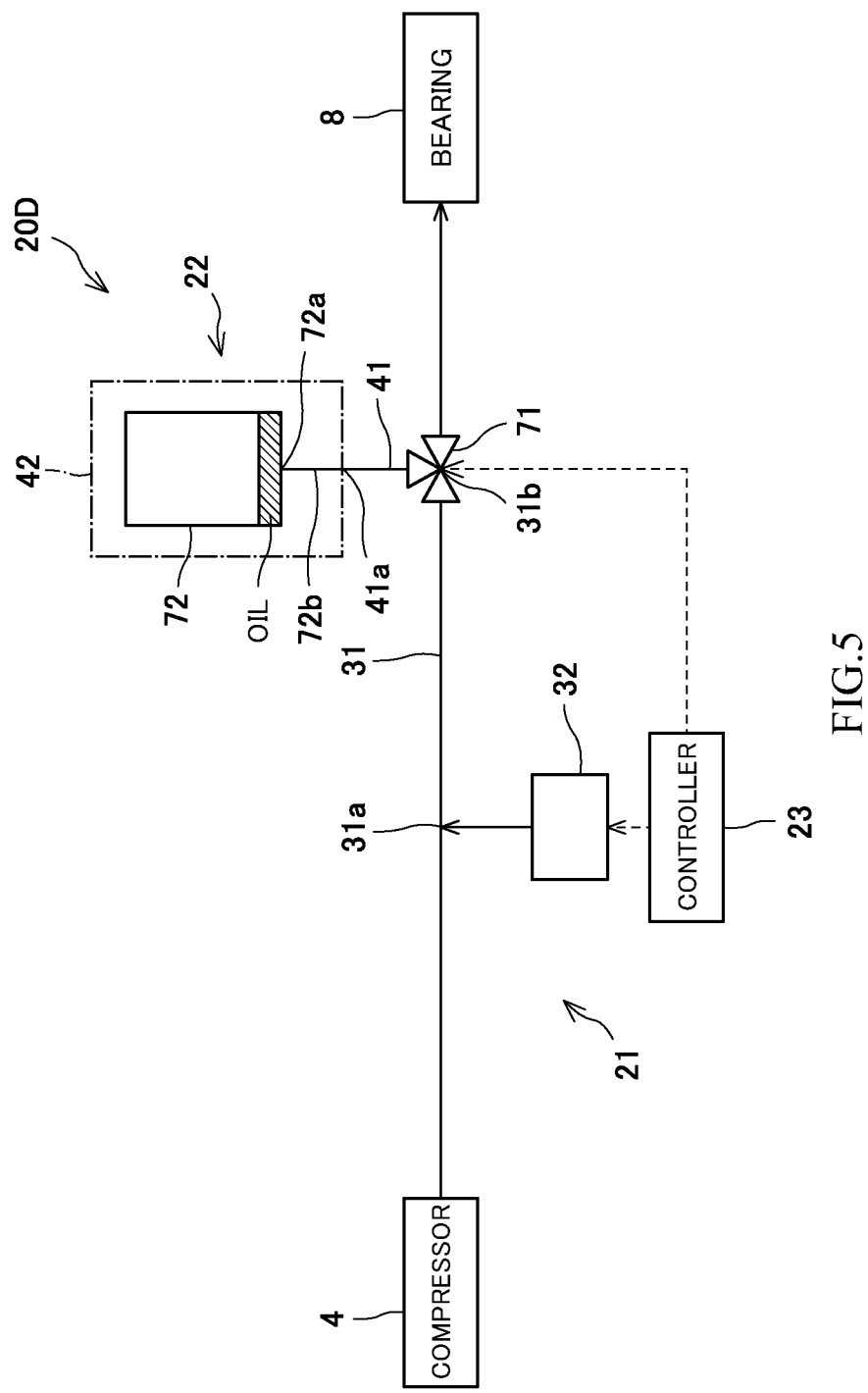
FIG. 5 is a schematic configuration diagram of the oil mist supply system of the gas turbine engine according to Modified Example of Embodiment 3.

Next, the gas turbine engine 1 according to Modified Example of Embodiment 3 will be described with reference to FIG. 5. FIG. 5 is a schematic configuration diagram of an oil mist supply system 20D of the gas turbine engine 1 according to Modified Example of Embodiment 3.

In Modified Example, a gas filled chamber 72 as the gas source stores the high-pressure oil mist. In other words, the gas filled chamber 72 stores a predetermined amount of oil and a high-pressure gas in a mixed state. When the cartridge 42 is attached to the upstream end portion 41a of the second supply passage 41, a gas outlet 72a of the gas filled chamber 72 is located at a lower portion of the gas filled chamber 72 (for example, a lower surface of the gas filled chamber 72). Therefore, the oil (for example, condensate of a part of the oil mist) stored in the gas filled chamber 72 may accumulate in at least one of a lower portion of an internal space of the gas filled chamber 72, the second supply passage 41, or a gas passage 72b connecting the gas outlet 72a and the upstream end portion 41a of the second supply passage 41.

In Modified Example, the three-way valve 71 serves as not only the "first backflow preventer" and the "second backflow preventer" but also the "opener." When the three-way valve 71 is switched from the first position to the second position, i.e., when the second supply passage 41 and the portion of the first supply passage 31 which portion is located downstream of the connection portion 31b are made to communicate with each other, the supply of the oil mist by the starting lubricator 22 to the bearings 8 is started. Moreover, when the three-way valve 71 is switched from the second position to the first position after the supply of the oil mist by the starting lubricator 22, the supply of the oil mist by the main lubricator 21 is realized.

In Modified Example, the same effects as in Embodiment 3 are obtained. Moreover, since the gas outlet 72a of the gas filled chamber 72 is located at the lower portion of the gas filled chamber 72, it is possible to prevent a case where only the high-pressure gas is supplied to the bearings 8 when the second supply passage 41 and the first supply passage 31 communicate with each other.

Other Embodiments

The present disclosure is not limited to the above embodiments, and various modifications may be made within the scope of the present disclosure.

For example, Embodiments 1, 2, and 3 and Modified Example of Embodiment 3 may be suitably combined with each other. For example, in Embodiment 1, instead of the on-off valve, the opener 52 may include the stopper that closes the gas outlet of the gas filled chamber 51 and the destroyer that destroys the stopper. Moreover, for example, in Embodiment 3 and Modified Example of Embodiment 3, instead of the gas filled chamber 51, 72, the gas source may be the gas generating chamber that stores the gas generating agent.

Moreover, the gas source may be the combination of the gas generating chamber and the gas filled chamber. For example, in Embodiment 2, the gas generating chamber 61 may be separated from a gas filled chamber that stores the high-pressure gas, by a stopper different from the stopper 63. Then, after the stopper between the gas generating chamber and the gas filled chamber is destroyed by the generation of the gas in the gas generating chamber 61, the stopper 63 may be destroyed by the pressure of the gas.

Moreover, in Embodiments 1 and 2, the first backflow preventer 33 and the second backflow preventer 44 do not have to be the check valves. For example, each of the first backflow preventer 33 and the second backflow preventer 44 may be an on-off valve that blocks not only the flow of the fluid from the downstream side to the upstream side in the first supply passage 31 or the second supply passage 41 but also the flow of the fluid from the upstream side to the downstream side in the first supply passage 31 or the second supply passage 41 at the same time. The first backflow preventer 33 and the second backflow preventer 44 may be, for example, electrically-driven on-off valves. In this case, the on-off valve disposed at a portion of the second supply passage 41 which portion is located downstream of the oil storing chamber 43 may serve as an opener instead of or in addition to the opener 52, 62.

Moreover, in Embodiments 1 and 2, the cartridge 42 may include not only the gas source but also the oil storing chamber 43. With this, the oil storing chamber 43 can be easily filled with the oil. Furthermore, the cartridge 42 does not have to include the opener 52, 62, and in this case, the opener 52, 62 may be disposed at a portion of the second supply passage 41 which portion is located between the oil storing chamber 43 and the gas source.

Moreover, the cartridge 42 does not have to be arranged in the first region 18a. To shorten the second supply passage 41, it is preferable to arrange the cartridge 42 in the vicinity of the first supply passage 31, for example, in the vicinity of the oil mist generator 32.

Moreover, the starting lubricator 22 does not have to include the cartridge 42 that is attachable to and detachable from the second supply passage 41. In this case, the gas source may be different in configuration from the gas filled chamber and the gas generating chamber and is only required to be able to supply the oil mist to the bearings 8. The gas source is different from the compressor 4 that supplies the gas by the start of the engine. The gas source can supply the gas even when the engine is in a stop state.

Moreover, the gas turbine engine according to each of at least some of the embodiments of the present disclosure is not limited to a two-shaft gas turbine engine and may be a single-shaft gas turbine engine. The gas turbine engine according to each of at least some of the embodiments of the present disclosure is not limited to an aircraft gas turbine engine and is applicable to, for example, an unmanned flying object. The gas turbine engine according to each of at least some of the embodiments of the present disclosure does not have to be a turbo fan engine and may be a turbojet engine.

The invention claimed is:

1. A gas turbine engine comprising,
a casing accommodating a compressor, a combustor, and a turbine;
bearings being in the casing;
a main lubricator including
an oil mist generator that generates oil mist by mixing oil with compressed air extracted from the compressor and
a first supply passage through which the oil mist is guided to the bearings; and
a starting lubricator including
a second supply passage that is connected to a portion of the first supply passage and through which a gas flowing out from a gas source is guided to a connection portion of the first supply passage, the connection portion being the portion of the first supply passage and
an opener that starts supply of the gas from the gas source through the second supply passage to the connection portion, wherein:
the main lubricator supplies the oil mist through the first supply passage to the bearings by pressure of the compressed air extracted from the compressor; and
when the opener starts the supply of the gas, the starting lubricator supplies the oil mist to the bearings through the second supply passage and a portion of the first supply passage located downstream of the connection portion, by the pressure of the gas flowing out from the gas source.

2. The gas turbine engine according to claim 1, wherein:
the starting lubricator includes a cartridge that is attachable to and detachable from the second supply passage; and
the cartridge includes as the gas source at least one of a gas filled chamber that is filled with a high-pressure gas or a gas generating chamber that stores a gas generating agent.

3. The gas turbine engine according to claim 1, wherein the opener is a three-way valve that switches between
a first position where a portion of the first supply passage located upstream of the connection portion and the portion of the first supply passage located downstream of the connection portion communicate with each other, and communication between the gas source and the portion of the first supply passage located downstream of the connection portion is blocked and
a second position where communication between the portion of the first supply passage located upstream of the connection portion and the portion of the first supply passage located downstream of the connection portion is blocked, and the gas source and the portion of the first supply passage located downstream of the connection portion communicate with each other.

4. The gas turbine engine according to claim 1, wherein:
the main lubricator further includes a first backflow preventer that prevents a fluid from flowing from the connection portion toward the compressor;
the starting lubricator further includes a second backflow preventer that prevents the fluid from flowing from the connection portion toward the gas source; and
the second backflow preventer is the opener itself or is a device different from the opener.

5. The gas turbine engine according to claim 4, wherein the opener is an on-off valve at the second supply passage or at a gas passage connecting the gas source and the second supply passage.

6. The gas turbine engine according to claim 4, wherein:
the gas source includes at least one of a gas filled chamber that is filled with a high-pressure gas or a gas generating chamber that stores a gas generating agent; and
the opener includes
a stopper that closes a gas outlet of the gas filled chamber or a gas outlet of the gas generating chamber and
a destroyer that destroys the stopper.

7. The gas turbine engine according to claim 4, wherein:
the starting lubricator further includes an oil storing chamber that is at the second supply passage and stores the oil;
the second backflow preventer is a check valve at a portion of the second supply passage located between the oil storing chamber and the connection portion; and
the opener is at a portion of the second supply passage located between the oil storing chamber and the gas source, a gas passage connecting the gas source and the second supply passage, or the gas source.

* * * * *